United States Patent
Rich

(10) Patent No.: US 10,552,759 B2
(45) Date of Patent: Feb. 4, 2020

(54) ITERATIVE CLASSIFIER TRAINING ON ONLINE SOCIAL NETWORKS

(71) Applicant: Facebook, Inc., Menlo Park, CA (US)

(72) Inventor: Mark Andrew Rich, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 1092 days.

(21) Appl. No.: 14/556,854

(22) Filed: Dec. 1, 2014

(65) Prior Publication Data
US 2016/0155063 A1    Jun. 2, 2016

(51) Int. Cl.
*G06N 20/00*      (2019.01)
*G06F 16/9535*    (2019.01)
*G06F 16/2457*    (2019.01)

(52) U.S. Cl.
CPC ....... *G06N 20/00* (2019.01); *G06F 16/24578* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,836,044 B2 | 11/2010 | Kamvar |
| 8,027,990 B1 | 9/2011 | Mysen |
| 8,060,639 B2 | 11/2011 | Smit |
| 8,112,529 B2 | 2/2012 | Van Den Oord |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |

(Continued)

*Primary Examiner* — Kakali Chaki
*Assistant Examiner* — Michael Zidanic
(74) *Attorney, Agent, or Firm* — Baker Botts L.L.P.

(57) ABSTRACT

In one embodiment, a method includes accessing a first set of objects associated with an online social network, each object being associated with one or more comments. The method also includes generating a second set of objects from the first set of objects by applying a first filtering criteria to the first set of objects and scoring each object in the second set of objects based on the comments associated with each object. The method further includes generating a training set of objects from the second set of objects by selecting each object from the second set of objects having a score greater than a first threshold score, each object in the training set being associated with a first object-classification. The method further includes determining an object-classifier algorithm for the first object-classification, the object-classifier algorithm being determined through an iterative training process performed one or more times.

20 Claims, 4 Drawing Sheets

(56) References Cited

U.S. PATENT DOCUMENTS

| | | |
|---|---|---|
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,639,725 B1 | 1/2014 | Udeshi |
| 8,732,208 B2 | 5/2014 | Lee |
| 8,751,521 B2 | 6/2014 | Lee |
| 8,782,080 B2 | 7/2014 | Lee |
| 8,868,603 B2 | 10/2014 | Lee |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0136419 A1 | 6/2006 | Brydon |
| 2006/0190436 A1 | 8/2006 | Richardson |
| 2007/0277100 A1 | 11/2007 | Sheha |
| 2008/0033926 A1 | 2/2008 | Matthews |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0094200 A1 | 4/2009 | Baeza-Yates |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0265326 A1 | 10/2009 | Lehrman |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0125562 A1 | 5/2010 | Nair |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191371 A1 | 8/2011 | Elliott |
| 2011/0196855 A1 | 8/2011 | Wable |
| 2011/0276396 A1 | 11/2011 | Rathod |
| 2011/0313992 A1 | 12/2011 | Groeneveld |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0311034 A1 | 12/2012 | Goldband |
| 2012/0331063 A1 | 12/2012 | Rajaram |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0226918 A1 | 8/2013 | Berkhim |
| 2013/0246404 A1 | 9/2013 | Annau |

ITERATIVE CLASSIFIER TRAINING ON ONLINE SOCIAL NETWORKS

TECHNICAL FIELD

This disclosure generally relates to online social networks, and in particular to classifying objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may determine an object-classifier algorithm through an iterative classifier training process. An object-classifier algorithm may be used to determine whether an object has a particular object-classification associated with the object-classifier algorithm. In particular embodiments, there may be multiple object-classifier algorithms, and each algorithm may be associated with a particular object-classification (and vice versa). An object-classifier algorithm may be used to classify posts (or other suitable objects) associated with the online social network based on comments associated with the posts. As an example and not by way of limitation, object-classifiers may be used to analyze posts and comments to determine whether a person is looking for a particular thing or service (e.g., a doctor, plumber, handyman, or car mechanic) or whether a person has a particular emotion or feeling (e.g., proud, happy, hungry, or tired).

Before beginning an iterative training process, an initial round of filtering and scoring may be performed on a set of objects to generate a training set of objects where each object in the training set has a particular object-classification. The training set can be used as an input to an iterative training process to determine an object-classifier algorithm for the particular object-classification. In particular embodiments, an object-classifier algorithm may be trained based on comments associated with the objects in the training set of objects. The training process may continue to iterate by accessing additional sets of objects for training the classifier and for classifying objects with the classifier. The training process may be repeated any suitable number of iterations. Through each iteration, the object-classifier algorithm may be refined until an object-classifier algorithm with a desired level of precision, recall, or accuracy has been obtained.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
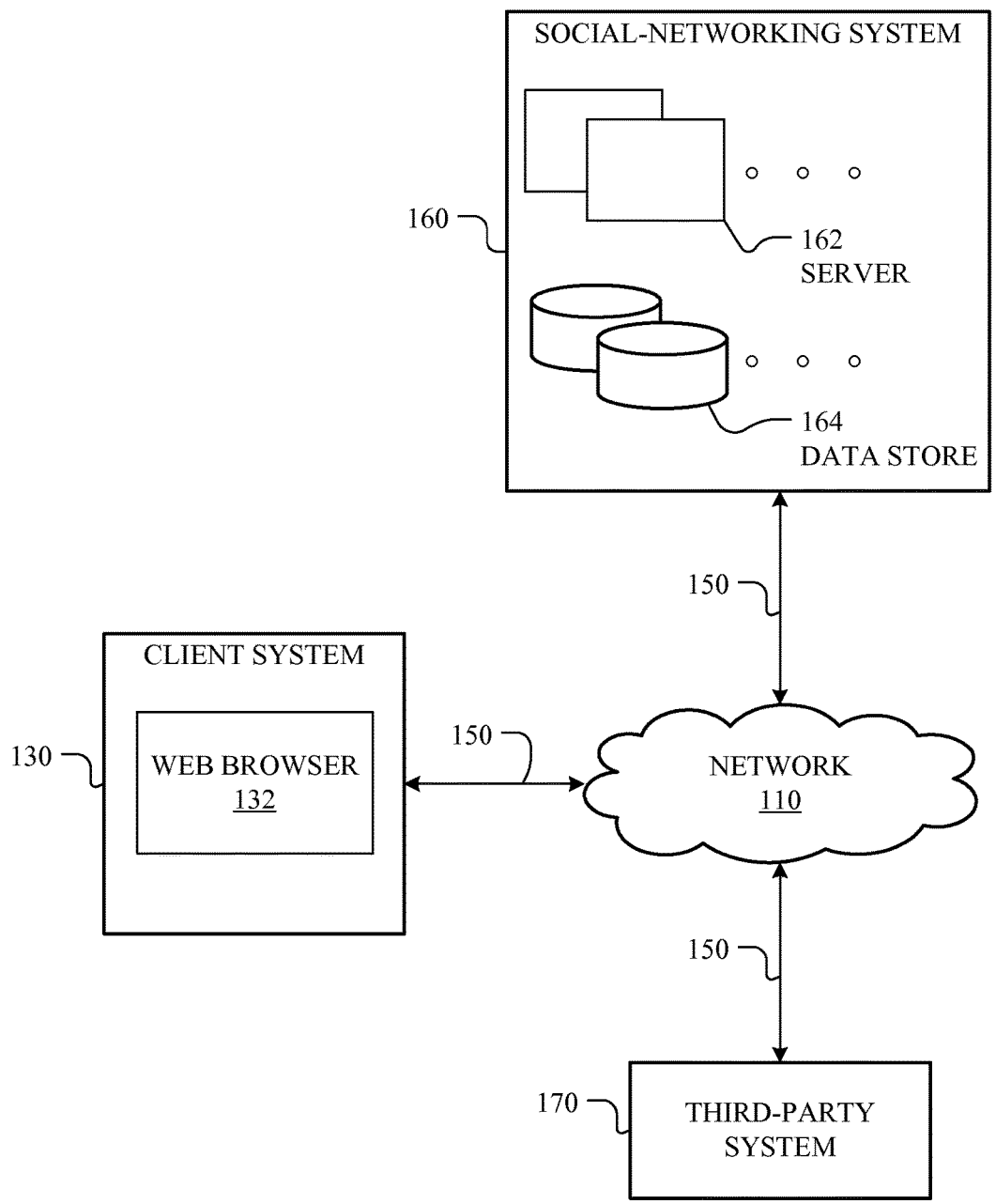
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable client system 130, social-networking system 160, or third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
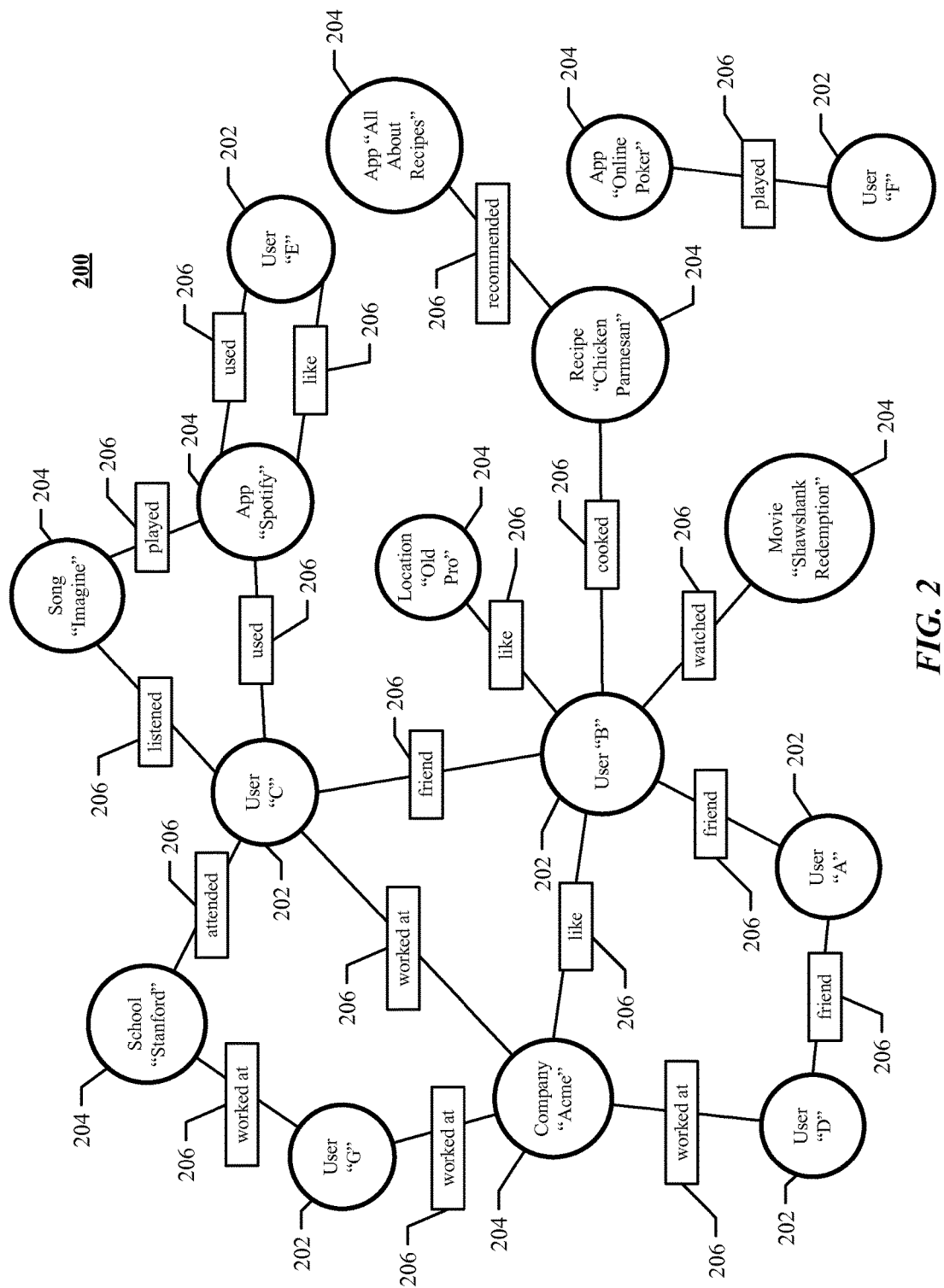
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Object-Classifier Algorithms

In particular embodiments, social-networking system 160 may determine an object-classifier algorithm through an iterative classifier training process. In particular embodiments, an object-classifier algorithm may be used to determine a classification for an object. In particular embodiments, a classification for an object may be referred to as an object-classification. Objects may include, for example, posts, news stories, headlines, instant messages, comments, chat room conversations, profile pages, web pages, emails, advertisements, pictures, videos, music, other suitable objects associated with the online social network, or any suitable combination thereof. In particular embodiments, object-classifications may include emotions or feelings (including, e.g., particular emotions or feelings such as proud, happy, sad, or feeling tired or hungry), questions or searches (e.g., a request for a recommendation for a doctor), locations, events, news, trends, sports, food, music, movies, pets, or any other suitable object-classifications. As an example and not by way of limitation, a post with the phrase "I'm starving" may be classified with a "feeling hungry" object-classification (indicating, e.g., that the poster feels hungry). In particular embodiments, an object-classifier algorithm may be referred to as an object-classifier. In particular embodiments, a particular object-classifier algorithm may be associated with a particular object-classification. As an example and not by way of limitation, an object-classifier algorithm that classifies objects associated with a user searching for a doctor may be associated with a "doctor search" object-classification. As another example and not by way of limitation, an object-classifier algorithm that classifies objects associated with a user feeling proud may be associated with a "feeling proud" object-classification. In particular embodiments, an object may be classified, using one or more object-classifiers, as having one or more particular object-classifications. As an example and not by way of limitation, a message that includes the phrase "I'm starving—let's go get a burrito" may be classified as having a "feeling hungry" object-classification as well as a "food" object-classification. As another example and not by way of limitation, a post from a user with the phrase "Yay! So happy the Giants won the World Series!" may be classified as having a "feeling happy" object-classification as well as a "baseball" object-classification. In particular embodiments, an object may be classified as having multiple object-classifications, where two or more of the object-classifications may have a hierarchical or nested relationship with one another. As an example and not by way of limitation, a post that includes the phrase "Going to a foreign film festival this weekend. Can't wait to see the restored version of Godard's Breathless" may be classified with a "film" classification. Additionally, the post may be classified with other object-classifications, such as for example "foreign film," "director: Jean-Luc Godard," and "movie: Breathless" classifications, and these other classifications may have a hierarchical relationship with the parent "film" classification (e.g., the "foreign film" classification may be a child classification under the "film" classification, and the "director: Jean-Luc Godard" and "movie: Breathless" classifications may in turn be child classifications under the "foreign film" classification). Although this disclosure describes particular object-classifications determined by particular object-classifier algorithms, this disclosure contemplates any suitable object-classifications determined by any suitable object-classifier algorithms.

In particular embodiments, there may be multiple object-classifications, and social-networking system 160 may determine an object-classifier for each object-classification. In particular embodiments, each object-classifier may be associated with a particular object-classification (and vice versa), and an object-classifier may analyze information associated with an object to determine whether that object has the particular object-classification. In particular embodiments, an object-classifier may produce a Boolean output (e.g., true or false; yes or no) to indicate whether or not a particular object has a particular object-classification. In other particular embodiments, an object-classifier may produce a score or a probability to indicate the probability that a particular object has a particular object-classification. As an example and not by way of limitation, an object-classifier may indicate that a particular object has an 89% probability of being associated with a particular object-classification. In particular embodiments, when classifying a particular object, an object-classifier may not consider the particular object but may instead consider other objects or metadata associated with the object. As an example and not by way of limitation, a classifier for classifying a post may not consider the text of the post itself but may consider comments and other objects or metadata associated with the post.

In particular embodiments, a classifier training process may refer to a process where an object-classifier algorithm is trained to identify, classify, score, or rank objects according to their association with a particular object-classification. In particular embodiments, a set of objects having a particular, known object-classification may be used to train a classifier on what constitutes the object-classification. In particular embodiments, when training an object-classifier with a set of objects having a known object-classification, the training process may not be based on the objects but may instead be based on other objects or metadata associated with the objects. As an example and not by way of limitation, a training process may consider comments associated with the objects rather than the text of the objects (e.g., comments on a post rather than the post itself). In particular embodiments, a classifier training process may be repeated one or more times, and the object-classifier may become more refined or more accurate after each iteration. Once a desired level of accuracy has been achieved, the iterative training process may be stopped, the object-classifier algorithm may be finalized, and the final version of the object-classifier algorithm may be used to determine whether an object has the particular object-classification.

Previous techniques related to determining an object-classifier algorithm may focus on object-classifiers that look primarily at the content of an object in order to classify the object (e.g., looking for keywords in the text of a post). However, these previous techniques can sometimes lead to misclassification of objects. As an example, a post containing text where the user is being sarcastic or when keywords are used in an unexpected context may lead to the post being misclassified by an object-classifier that primarily looks at the post. Particular embodiments of this disclosure address some of the shortcomings of previous techniques by training an object-classifier that looks beyond the content of a post to examine metadata or other objects associated with the object being classified. As an example and not by way of limitation, an object-classifier may be trained to classify a post based at least in part on comments associated with the post. An object-classifier trained to consider other objects or metadata associated with an object may result in an improved or more accurate object-classifier.

Accessing a Set of Objects

In particular embodiments, social-networking system 160 may access an initial set (also referred to herein as a "first set") of objects associated with an online social network (e.g., objects hosted by social-networking system 160, or objects hosted by a third-party system that are associated with the online social network). In particular embodiments, the initial set of objects may be used to generate a training set of objects for training an object-classifier algorithm. In particular embodiments, accessing an initial set of objects may include retrieving objects from one or more data stores 164 of social-networking system 160. Each object in the initial set of objects may have an object-type that may include, for example, photos, posts, pages, applications, events, locations, user groups, other suitable object-types, or any suitable combination thereof. In particular embodiments, an object may have metadata or other objects associated with it. In particular embodiments, each object in the initial set of objects may be associated with one or more comments. As an example and not by way of limitation, the objects in the initial set of objects may be posts on the online social network, and each post may have one or more comments associated with it. As another example and not by way of limitation, the objects in the initial set of objects may include posts on a third-party website, and each post may have one or more associated comments, where the comment functionality is implemented using a social plug-in that is associated with the online social network. Although this disclosure describes particular objects being associated with the online social network, this disclosure contemplates any suitable objects being associated with the online social network.

In particular embodiments, social-networking system 160 may access a social graph that includes multiple nodes and multiple edges connecting the nodes, each node corresponding to an object associated with the online social network. In particular embodiments, for each object in the initial set of objects, the object may be a post by a first user of the online social network corresponding to a first node of the social graph. In particular embodiments, each comment associated with the object may be a comment on the post by a second user of the online social network, where each second user corresponds to a second node, and each second node is within a single degree of separation from the first node in the social graph. In particular embodiments, comments associated with a particular object may include one or more comments on the object by the first user (e.g., the user who generated or posted the particular object) as well as one or more comments on the object by a second user. As an example and not by way of limitation, a first user may post a question, such as for example, "Can anyone recommend a plumber? My sink is clogged." In response to the first user's post, one or more second users may add comments that include recommendations for plumbers. Also, the first user may add a comment to give the second users an update on the first user's original post or to provide additional information. As an example and not by way of limitation, the first user may write a comment thanking the second users for their comments (e.g., "Thanks for all the recommendations! I located a plumber.") Although this disclosure describes particular objects with particular associated comments, this disclosure contemplates any suitable objects with any suitable associated comments.

In particular embodiments, the objects in the initial set of objects (as well as the objects in the test set and revised initial set described below) may include objects that are randomly selected from objects associated with the online social network. In particular embodiments, the objects in the initial set of objects (as well as the objects in the test set and revised initial set described below) may include greater than one-hundred thousand objects, greater than one million objects, greater than ten million objects, greater than one-hundred million objects, or greater than any suitable number of objects. As an example and not by way of limitation, social-networking system 160 may access the initial set of objects by randomly selecting one million posts from posts associated with the online social network. Although this disclosure describes accessing particular numbers and types of objects in a particular manner, this disclosure contemplates accessing any suitable numbers and types of objects in any suitable manner.

Filtering Objects

In particular embodiments, after accessing an initial set of objects, social-networking system 160 may generate a filtered set (also referred to herein as a "second set") of objects from the initial set of objects by applying a filtering criteria to the initial set of objects. In particular embodiments, filtering criteria applied to the initial set of objects may be relatively broad or may be configured to add objects to the filtered set that fulfill one or more general criteria and remove from consideration objects that do not meet one or more of the general criteria. As an example and not by way of limitation, a set of filtering criteria applied to an object may include one or more of the following: the object is a post; the object has one or more associated comments; the object was posted within the past 30 days; or the object is written in English. In particular embodiments, an object-classifier may be associated with a user posting a request for information or services. As an example and not by way of limitation, a user may post a request asking for a recommendation for a doctor, plumber, electrician, car mechanic, restaurant, movie, or any other suitable type of service, place, or event. A set of filtering criteria directed to finding posts where a user posted a question to request information or services may include one or more of the following: the object includes a question mark ("?"); the object has a comment from the original poster that includes "thanks," "thank," or "thank you"; the object is a post; the object has one or more associated comments; the object was posted within the past 30 days; or the object is written in English. In particular embodiments, a filtering process may include 1, 2, 4, 6, 10, 20, 50, or any suitable number of filtering criteria.

In particular embodiments, applying a filtering criteria to an initial set of objects may include comparing metadata associated with each object in the initial set of objects to a set of filtering criteria. In particular embodiments, generating the filtered set of objects may include adding objects from the initial set of objects to the filtered set based on the comparison of the metadata to the filtering criteria. In particular embodiments, metadata associated with an object may include one or more of: social-graph information associated with the object, other objects associated with the object, a language associated with the object, a time or date associated with the object, or any combination thereof. As an example and not by way of limitation, a filtering criteria may be associated with a particular language (e.g., a filtering criteria may require that the object was written in English). As another example and not by way of limitation, a filtering criteria may be associated with a time or date (e.g., the object was posted within the past 30 days). In particular embodiments, social-graph information may include an affinity coefficient between first and second users of the online social network, the first user being associated with an object in the initial set of objects. As an example and not by way of limitation, a filtering criteria may include a requirement that an affinity coefficient between first and second users be greater than a threshold value. In particular embodiments, other objects associated with the object may include objects (as well as social-graph data and other metadata associated with these objects) associated with a particular type of place (e.g., a movie theater, restaurant, landmark, or city), a particular type of entity (e.g., a person, business, group, sports team, or celebrity), a particular type of resource (e.g., an audio file, video file, digital photo, text file, structured document, sticker, post/comment on the online social network, or application, including references to social-graph entities associated with the resource, such as tags, links, check-ins, etc., or other types of structured data associated with the reference), a particular type of real or intellectual property (e.g., a sculpture, painting, movie, game, song, idea, photograph, or written work), other suitable content objects, or any combination thereof. As an example and not by way of limitation, a filtering criteria may include a requirement that an object include or be associated with a particular tag or sticker. In particular embodiments, a sticker may refer to an illustration or an animation, and a user may include a sticker in an object (e.g., a post or a message) to indicate how they are feeling (e.g., a sticker may indicate that the user is feeling happy, sad, proud, tired, or hungry). In particular embodiments, metadata associated with a particular object may exclude the text or words of the object but may include punctuation marks (e.g., question mark or exclamation mark) or symbols included in an object. As an example and not by way of limitation, an object that is a post may include a question mark, and the filtering criteria may include a requirement that the object include a question mark as an indication that the poster may be asking a question or requesting information. In particular embodiments, metadata associated with a particular object may include any suitable set of text associated with the object, such as for example text in a comment. In particular embodiments, metadata associated with a particular object may include any suitable type of structured data or non-textual data associated with the object, such as for example tags, minutiae (e.g., small data elements), social-graph data (likes, check-ins, etc.), photos, or links. Although this disclosure describes particular filtering processes that include particular types and numbers of filtering criteria, this disclosure contemplates any suitable filtering processes that include any suitable types and numbers of filtering criteria.

In particular embodiments, in order for an object to be added to the filtered set of objects, a filtering process may require that all of the filtering criteria be met; that some number or percentage of filtering criteria be met; or that some particular filtering criteria be met while some number or percentage of other filtering criteria is also met. As an example and not by way of limitation, for a filtering process that includes six filtering criteria, an object from the initial set of objects may be added to the filtered set of objects if it fulfills all six of the specified criteria. As another example and not by way of limitation, a filtering process may require that at least five out of six filtering criteria be met or at least 83% of the filtering criteria be met. As another example and not by way of limitation, a filtering process may require that two particular filtering criteria be met (e.g., the object must include a question mark, and the object must have one or more associated comments) and at least 75% of the remaining filtering criteria be met. In particular embodiments, the filtered set of objects may include any suitable percentage of the objects from the initial set (e.g., the filtered set may include approximately 50%, 30%, 20%, 10%, 5%, or 1% of the objects from the initial set). As an example and not by way of limitation, the initial set of objects may include approximately ten million objects, and after filtering, the filtered set of objects may include approximately one million objects.

Scoring Objects

In particular embodiments, after generating a filtered set of objects from an initial set of objects, social-networking system 160 may score each object in the filtered set of objects based on comments associated with each object. As an example and not by way of limitation, an object score for each object in the filtered set may be generated to determine how strongly the object or the object's comments are associated or correlated with a particular object-classification. A higher object score may indicate a stronger association of an object with a particular object-classification. In particular embodiments, scoring each object in the filtered set of objects may include determining, for each object in the filtered set of objects, a score for each comment associated with the object. In particular embodiments, scoring each object in the filtered set of objects may include combining, for each object in the filtered set of objects, the scores for the comments to produce an object score. In particular embodiments, an object score may be determined as an average of the scores for the comments associated with the object. As an example and not by way of limitation, an object having four comments with scores of 4, 6, 0, and 10, respectively, may have an object score of (4+6+0+10)/4=5. Although this disclosure describes scoring objects based on comments in a particular manner, this disclosure contemplates scoring objects based on comments in any suitable manner.

In particular embodiments, scoring each object in the filtered set of objects may include determining a score for each comment associated with the object by comparing the comment to a set of regular expressions associated or correlated with a particular object-classification. In particular embodiments, a regular expression may refer to a sequence of characters that form a search pattern for use in finding matching strings within a comment. As an example and not by way of limitation, the regular expression "barbe[cq]ue" may be used to search for both "barbecue" and "barbeque" in a comment. In particular embodiments, a set of regular expressions used to score an object may be referred to as a seed set of expressions and may act as a seed input to a routine for determining an object-classifier. In particular embodiments, as an initial step for determining an object-classifier for a particular object-classification, a seed set of expressions for the object-classification may, at least in part, be determined manually by a person. As an example and not by way of limitation, for an object-classification associated with car repair, a person may determine that the seed set of expressions should include the terms "car repair," "car mechanic," "auto repair," and "automobile mechanic." In particular embodiments, a seed set of expressions may include 1, 2, 3, 5, 10, 20, 50, 100, or any suitable number of expressions. In particular embodiments, a comment may be analyzed to find matching seed expressions in the comment, and the comment's score may be proportional to the number of matching expressions found in the comment. As an example and not by way of limitation, a seed set of expressions associated with a user searching for a doctor may include one or more of the following: "doctor," "pediatrician," "dr," "physician," "recommend," "love," a phone number, other suitable expressions, or any combination thereof. Such an example seed set of expressions may result in a relatively high score for a comment that includes the phrase: "I love my doctor and can recommend her highly. Here's her phone number: 650-555-1234." As another example and not by way of limitation, a seed set of expressions associated with a user feeling proud may include one or more of the following: "congratulations," "congrats," "happy for you," or "great news." Such an example seed set of expressions may result in a relatively high score for a comment that includes the phrase: "Congrats! I'm so happy for you. That's really great news." Although this disclosure describes particular seed sets of expressions that include particular numbers and types of expressions, this disclosure contemplates any suitable seed sets of expressions that include any suitable numbers and types of expressions.

In particular embodiments, a comment's score may be incremented by a particular amount (e.g., incremented by 1) for each matching seed expression in the comment. As an example and not by way of limitation, a comment that includes matches for six seed expressions may have a comment score of six. In other particular embodiments, a comment's score may be a weighted combination or average of the number of matches, where particular weighting factors are applied to particular seed expressions based on their relative degree of importance. As an example and not by way of limitation, for a user searching for a doctor, the seed expressions "doctor," "pediatrician," "dr," or "physician" may be assigned a higher weighting factor than the seed expressions "recommend" or "love." In particular embodiments, while expressions in a seed set may have a positive correlation with a particular object-classification, there may be other expressions that have a negative correlation with the object-classification. As an example and not by way of limitation, although the terms "rug doctor," "PC doctor," or "iPhone doctor" each include the word "doctor," these terms may be negatively correlated with a user searching for a doctor since they may be associated with a user looking for a rug cleaner, computer repair, or iPhone repair, respectively. In particular embodiments, a score for a comment may be based on comparing the comment with a positively correlated seed set of expressions as well as with a set of expressions having a negative correlation with a particular object-classification. As an example and not by way of limitation, each instance of a seed expression found in a comment may increase the comment's score by 1, while each instance of a negatively-correlated expression may decrease the comment's score by 1. Although this disclosure describes scoring comments in a particular manner, this disclosure contemplates scoring comments in any suitable manner.

Generating a Training Set of Objects

In particular embodiments, after scoring objects in a filtered set of objects, social-networking system 160 may generate a training set of objects from the filtered set of objects by selecting each object from the filtered set having a score greater than a threshold score. As an example and not by way of limitation, objects in the filtered set may have scores ranging from 0 to 100, and the threshold score may be 85 so that any object with a score greater than 85 is added to the training set. In particular embodiments, each object in the training set may be associated with a particular object-classification. As an example and not by way of limitation, objects in a training set based on a seed set of expressions associated with a "feeling proud" object-classification may be classified as having a "feeling proud" object-classification. In particular embodiments, a threshold score may be greater than the scores for 60%, 75%, 90%, 95%, 99%, or any suitable percentage of the objects in the filtered set of objects. As an example and not by way of limitation, if a filtered set of objects includes 1,000,000 objects and the threshold score is greater than the scores for 90% of the objects in the filtered set, then the training set will include approximately 100,000 objects from the filtered set having the highest object scores. In particular embodiments, a training set of objects may include any suitable number of objects (e.g., 1,000 objects, 10,000 objects, 100,000 objects, or 1,000,000 objects). Although this disclosure describes generating a training set in a particular manner, this disclosure contemplates generating a training set in any suitable manner.

Iterative Classifier Training

In particular embodiments, after generating a training set of objects where each object in the training set has a particular object-classification, social-networking system 160 may determine an object-classifier algorithm for the particular object-classification. In particular embodiments, the object-classifier algorithm may be determined through an iterative training process performed one or more times, where the training set of objects may be used as an initial training set for the first iteration of the iterative training process. In particular embodiments, after each iteration of the iterative training process, the object-classifier algorithm may be examined to determine whether a desired level of precision, recall, or accuracy has been achieved. If so, the iterative training process may be halted, and the object-classifier algorithm is complete. Otherwise, another iteration of the iterative training process may be performed. In particular embodiments, the iterative training process may be a supervised machine learning process that requires some manual input or determination to decide when a sufficiently accurate object-classifier has been achieved. In particular embodiments, one, two, three, four, or any suitable number of iterations of an iterative training process may be performed to determine an object-classifier algorithm that has an acceptable level of precision, recall, or accuracy. As an example and not by way of limitation, two iterations of an iterative training process may be sufficient to generate an object-classifier algorithm with an acceptable level of accuracy. In particular embodiments, each iteration of an iterative training process may include a series of steps, each of which is described below. Although this disclosure describes a particular iterative training process for determining particular object-classifiers, this disclosure contemplates any suitable iterative training process for determining any suitable object-classifiers.

Initial Object-Classifier Algorithm

In particular embodiments, social-networking system 160 may train an initial object-classifier algorithm based on comments associated with objects in a training set of objects. In particular embodiments, training an initial object-classifier algorithm may include analyzing the comments associated with the training set of objects to determine a set of features associated with a particular object-classification. One or more of the features may be incorporated into the initial object-classifier algorithm. In particular embodiments, features may include particular words, terms, or phrases (e.g., regular expressions) in comments where the features are associated with a particular object-classification. As an example and not by way of limitation, comments for a training set of objects having a "cycling" object-classification may be analyzed to determine a set of features that may include one or more of the following terms: bicycle, cycling, road bike, mountain bike, Tour de France, derailleur, helmet, or any other suitable term associated with cycling. In particular embodiments, analysis of comments associated with objects in a training set may yield a set of features that includes any suitable number of features (e.g., 100, 500, 1,000, 10,000, 100,000, or any suitable number of features). In particular embodiments, training an initial object-classifier algorithm may be based on a revised object-classifier algorithm (described below) trained in a prior iteration of the iterative training process. As an example and not by way of limitation, a previous iteration of an iterative training process may determine a revised object-classifier algorithm, and this revised object-classifier algorithm may be used as a starting point for an initial object-classifier algorithm in a subsequent iteration of the training process.

In particular embodiments, features associated with comments may be determined at least in part by applying one or more of the following analyses to the comments for a training set of objects: term-frequency analysis, term-frequency-inverse-document-frequency (tf-idf) analysis, topic-extraction analysis, or sentiment analysis. Term-frequency analysis involves counting the number of occurrences of a term in a comment. In particular embodiments, the number of occurrences of a term may be normalized to prevent a bias towards longer comments. A tf-idf approach uses a statistical measure to evaluate how important a word or feature is to a document in a collection of documents (e.g., how important a word is to a comment in a collection of comments associated with a training set of objects). In particular embodiments, social-networking system 160 may identify an anchor term in a comment. Accordingly, social-networking system 160 may use a topic-extraction mechanism or system to determine a corresponding feature by identifying one or more nodes from social graph 200 that closely match the anchor term. In particular embodiments, identifying features may be based at least in part on a sentiment analysis of comments. More information on topic extraction may be found in U.S. patent application Ser. No. 13/167,701, filed 23 Jun. 2011, which is incorporated by reference. Furthermore, more information on sentiment analysis may be found in U.S. patent application Ser. No. 14/023,136, filed 10 Sep. 2013, which is incorporated by reference. Although this disclosure describes determining features in particular manners, this disclosure contemplates determining features in any suitable manner.

In particular embodiments, training an initial object-classifier algorithm may include scoring each feature in the set of features. In particular embodiments, each feature may be scored based at least in part on a frequency of occurrence of the feature in the comments associated with the objects in the training set. As an example and not by way of limitation, term-frequency analysis or tf-idf analysis may be used to determine a score for a feature, and a higher score may indicate a stronger correlation, relevance, or importance of a feature to a particular object-classification. In particular embodiments, training an initial object-classifier algorithm may include modifying the initial object-classifier algorithm to associate at least in part a particular object-classification with one or more of the features in the set of features having a score greater than a threshold feature score. In particular embodiments, modifying the initial object-classifier algorithm may include adding top-scoring features to the algorithm so that the algorithm may recognize those features as being associated with a particular object-classification. In particular embodiments, a threshold feature score may be greater than the scores for any suitable percentage of the features (e.g., a threshold feature score may be greater than 80%, 90%, 95%, 99% of the feature scores). As an example and not by way of limitation, analysis of comments associated with objects in a training set may yield a set of 10,000 features, and a threshold feature score may have a value that results in the top 200 features being added to the initial object-classifier algorithm. Although this disclosure describes training an initial object-classifier algorithm in a particular manner, this disclosure contemplates training an initial object-classifier algorithm in any suitable manner.

In particular embodiments, after training an initial object-classifier algorithm, social-networking system 160 may access a test set (also referred to herein as a "third set") of objects associated with the online social network. In particular embodiments, the test set of objects may be accessed in a manner similar to the initial set of objects described previously. As an example and not by way of limitation, the test set of objects may include 10 million objects randomly selected from one or more data stores 164 of social-networking system 160. In particular embodiments, social-networking system 160 may apply a filtering criteria to the test set of objects, and objects not meeting particular filtering criteria may be removed from the test set of objects. In particular embodiments, the filtering criteria applied to the test set of objects may be similar to the filtering criteria applied to the initial set of objects or may be similar to but less restrictive than the filtering criteria applied to the initial set of objects.

In particular embodiments, social-networking system 160 may classify, using the initial object-classifier algorithm, each object in the test set of objects based on an analysis of the comments associated with each object. In particular embodiments, classifying each object in the test set of objects may include comparing the comments associated with an object in the test set to features associated with the initial object-classifier algorithm to determine whether the object is classified with a particular object-classification. In particular embodiments, an initial object-classifier algorithm may search for the occurrence of features in the comments, and objects having comments with more matches to the features are more likely to be classified as having the particular object-classification associated with the initial object-classifier algorithm. In particular embodiments, after running the initial object-classifier algorithm, one or more of the objects in the test set of objects may be classified with the object-classification corresponding to the algorithm. As an example and not by way of limitation, from a test set of objects that includes 10 million objects, approximately 100, 500, 1,000, 10,000, or any suitable number of objects may be classified as having the particular object-classification associated with the initial object-classifier algorithm. In particular embodiments, objects classified as having the particular object-classification may be examined to assess the accuracy of the initial object-classifier algorithm. In particular embodiments, if the initial object-classifier algorithm has achieved a sufficient level of accuracy, the iterative training process may be stopped, and the initial object-classifier algorithm may become a final version of an object-classifier algorithm. Although this disclosure describes classifying objects in a particular manner, this disclosure contemplates classifying objects in any suitable manner.

Revised Object-Classifier Algorithm

In particular embodiments, social-networking system 160 may train a revised object-classifier algorithm. The training process may be based at least in part on comments associated with objects in the test set of objects having the object-classification associated with the initial object-classifier algorithm. Those comments are used as inputs for training a revised object-classifier algorithm. In particular embodiments, similar to the process for training the initial object-classifier algorithm discussed above, training a revised object-classifier algorithm may include analyzing the comments associated with the objects in the test set having the particular object-classification to determine a set of revised features associated with the particular object-classification. In particular embodiments, a revised object-classifier algorithm may be based on the initial object-classifier algorithm, and the revised object-classifier algorithm may be a refined or improved version of the initial object-classifier algorithm. Additionally, in particular embodiments, training object-classifier algorithms in this and subsequent iterations may be a process of refining or improving an object-classifier algorithm until a desired level of accuracy is achieved. In particular embodiments, training the revised object-classifier algorithm may include adding one or more of the revised features to the features associated with the initial object-classifier algorithm. Training the revised object-classifier algorithm may also include removing one or more features from the initial object-classifier algorithm.

In particular embodiments, training a revised object-classifier algorithm may include scoring each revised feature in the set of revised features. Similar to the feature scoring process discussed above, in particular embodiments, each revised feature may be scored based at least in part on a frequency of occurrence of the feature in the comments associated with the objects in the test set of objects having the particular object-classification. In particular embodiments, training a revised object-classifier algorithm may include modifying the revised object-classifier algorithm or the initial object-classifier algorithm to associate at least in part a particular object-classification with one or more of the features in the set of revised features having a score greater than a threshold feature score. As discussed above, modifying an object-classifier algorithm may include adding top-scoring features to the algorithm so that the algorithm may recognize those features as being associated with a particular object-classification. Although this disclosure describes training a revised object-classifier algorithm in a particular manner, this disclosure contemplates training a revised object-classifier algorithm in any suitable manner.

In particular embodiments, after training a revised object-classifier algorithm, social-networking system 160 may access a new filtered set (also referred to herein as a "fourth set") of objects associated with the online social network. In particular embodiments, the new filtered set of objects may be generated by applying a filtering criteria to a revised initial set (also referred to herein as a "fifth set") of objects associated with the online social network. In particular embodiments, the revised initial set of objects may be accessed in a manner similar to the initial and test sets of objects described previously. As an example and not by way of limitation, the revised initial set of objects may include 50 million objects randomly selected from one or more data stores 164 of social-networking system 160. In particular embodiments, the filtering criteria applied to the revised initial set of objects to generate the new filtered set of objects may be similar to the filtering criteria applied to the initial set of objects or may be similar to but less restrictive than the filtering criteria applied to the initial set of objects. As an example and not by way of limitation, a set of filtering criteria applied to objects in the revised initial set of objects may include one or more of the following: the object is a post; the object has one or more associated comments; the object was posted within the past 30 days; or the object is written in English.

In particular embodiments, social-networking system 160 may classify, using the revised object-classifier algorithm, each object in the new filtered set of objects based on an analysis of the comments associated with each object. In particular embodiments, classifying each object in the new filtered set of objects may include comparing the comments associated with an object in the new filtered set to features associated with the revised object-classifier algorithm to determine whether the object is classified with a particular object-classification. Objects having comments with more matches to the features are more likely to be classified as having the particular object-classification associated with the revised object-classifier algorithm. In particular embodiments, after running the revised object-classifier algorithm, one or more of the objects in the new filtered set of objects may be classified with the object-classification corresponding to the algorithm. In particular embodiments, objects classified as having the particular object-classification may be examined to assess the accuracy of the revised object-classifier algorithm. In particular embodiments, if the revised object-classifier algorithm has achieved a sufficient level of accuracy, the iterative training process may be stopped, and the revised object-classifier algorithm may become a final version of an object-classifier algorithm. Although this disclosure describes classifying objects in a particular manner, this disclosure contemplates classifying objects in any suitable manner.

Training Set for a Subsequent Iteration

In particular embodiments, social-networking system 160 may generate a new training set (also referred to herein as a "sixth set") of objects from the new filtered set of objects by selecting each object from the new filtered set of objects having a score greater than a second threshold score. In particular embodiments, a second threshold score may be greater than the scores for 60%, 75%, 90%, 95%, 99%, or any suitable percentage of the objects in the new filtered set of objects. In particular embodiments, for each object classified by an object-classifier, the object-classifier may produce a score or a probability that the object has a particular object-classification. In particular embodiments, the score for a particular object from the new filtered set of objects may be based on the number of occurrences, in the object's associated comments, of features associated with the revised object-classifier algorithm, and the score may be proportional to the number of matches. In particular embodiments, a score for an object from the new filtered set may indicate a probability that the object has the object-classification associated with the revised object-classifier algorithm. In particular embodiments, the new training set of objects may be used as a training set in a next iteration of the iterative training process.

Figure 3:
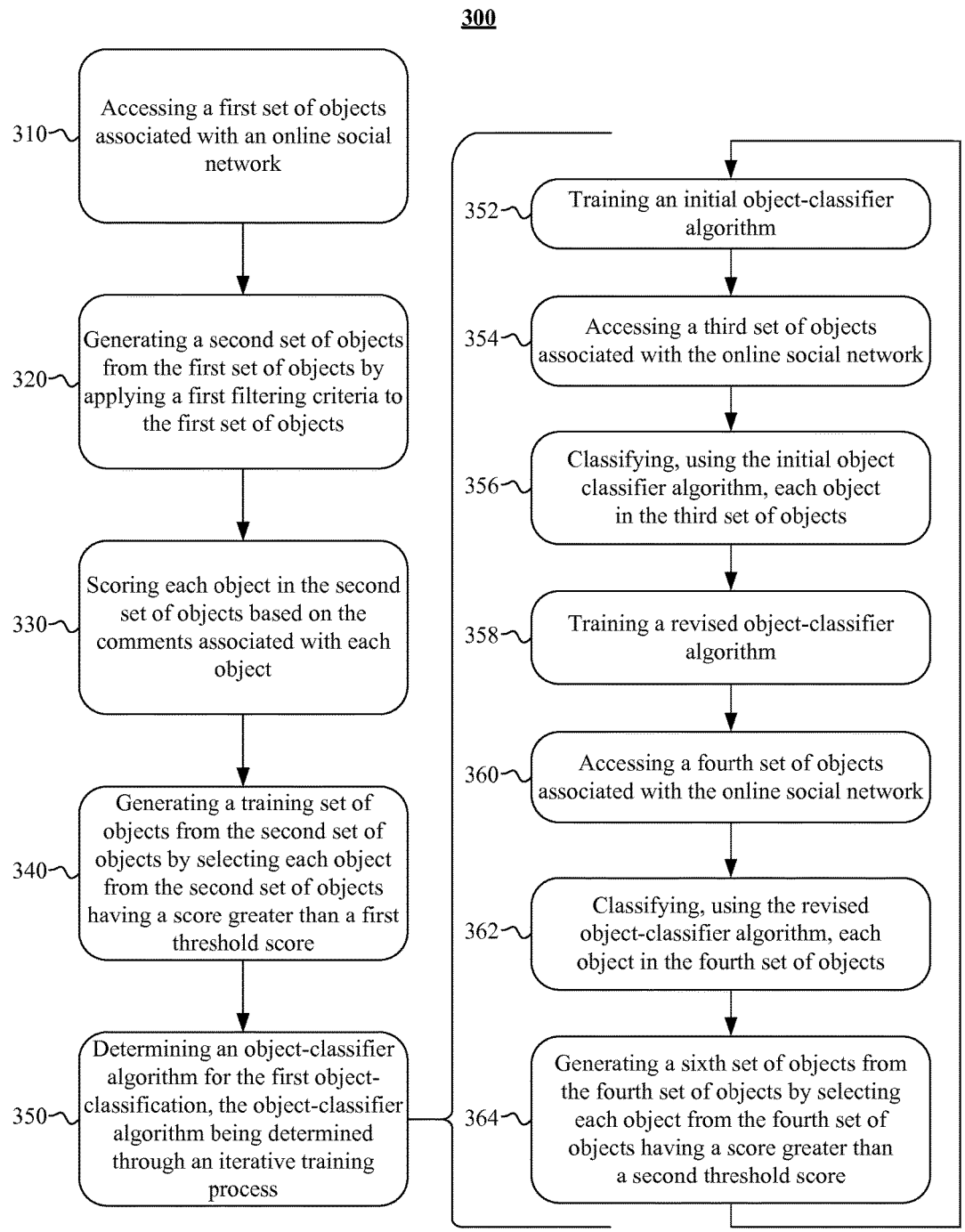
FIG. 3 illustrates an example method for determining an object-classifier through iterative classifier training.

FIG. 3 illustrates example method 300 for determining an object-classifier through iterative classifier training. The method may begin at step 310, where social-networking system 160 may access an initial set of objects (also referred to herein as a "first set") of objects associated with an online social network. In particular embodiments, each object in the initial set of objects may be associated with one or more comments. As an example and not by way of limitation, each object in the initial set of objects may be a post by a first user of the online social network, and one or more comments associated with the object may be comments on the post by a second user of the online social network. At step 320, social-networking system 160 may generate a filtered set (also referred to herein as a "second set") of objects from the initial set of objects by applying a first filtering criteria to the initial set of objects. At step 330, social-networking system 160 may score each object in the filtered set of objects based on the comments associated with each object. At step 340, social-networking system 160 may generate a training set of objects from the filtered set of objects by selecting each object from the filtered set of objects having a score greater than a first threshold score. In particular embodiments, each object in the training set may be associated with a first object-classification. At step 350, social-networking system 160 may determine an object-classifier algorithm for the first object-classification, the object-classifier algorithm being determined through an iterative training process. In particular embodiments, each iteration of the iterative training process may include one or more of steps 352-364 as illustrated in FIG. 3 and as described below. In particular embodiments, the iterative training process may be performed one or more times, at which point the method may end. At step 352, social-networking system 160 may train an initial object-classifier algorithm. In particular embodiments, training the initial object-classifier algorithm may be based on the comments associated with the objects in the training set of objects. At step 354, social-networking system 160 may access a test set (also referred to herein as a "third set") of objects associated with the online social network. At step 356, social-networking system 160 may classify, using the initial object-classifier algorithm, each object in the test set of objects. In particular embodiments, classifying each object in the test set of objects may be based on an analysis of the comments associated with each object. In particular embodiments, one or more of the objects in the test set of objects may be classified with the first object-classification. At step 358, social-networking system 160 may train a revised object-classifier algorithm. In particular embodiments, training the revised object-classifier algorithm may be based on the comments associated with the objects in the test set of objects having the first object-classification. At step 360, social-networking system 160 may access a new filtered set (also referred to herein as a "fourth set") of objects associated with the online social network. In particular embodiments, the new filtered set of objects may be generated by applying a second filtering criteria to a revised initial set (also referred to herein as a "fifth set") of objects associated with the online social network. At step 362, social-networking system 160 may classify, using the revised object-classifier algorithm, each object in the new filtered set of objects. In particular embodiments, classifying each object in the new filtered set of objects may be based on an analysis of the comments associated with each object. In particular embodiments, one or more objects in the new filtered set of objects may be classified with the first object-classification. At step 364, social-networking system 160 may generate a new training set (also referred to herein as a "sixth set") of objects from the new filtered set of objects by selecting each object from the new filtered set of objects having a score greater than a second threshold score. In particular embodiments, each object in the new training set of objects may be associated with the first object-classification. In particular embodiments, the new training set of objects may be used as the training set in a next iteration of the iterative training process. Particular embodiments may repeat one or more steps of method 300 of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for determining an object-classifier through iterative classifier training, including the particular steps of the method of FIG. 3, this disclosure contemplates any suitable method for determining an object-classifier through iterative classifier training including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 4:
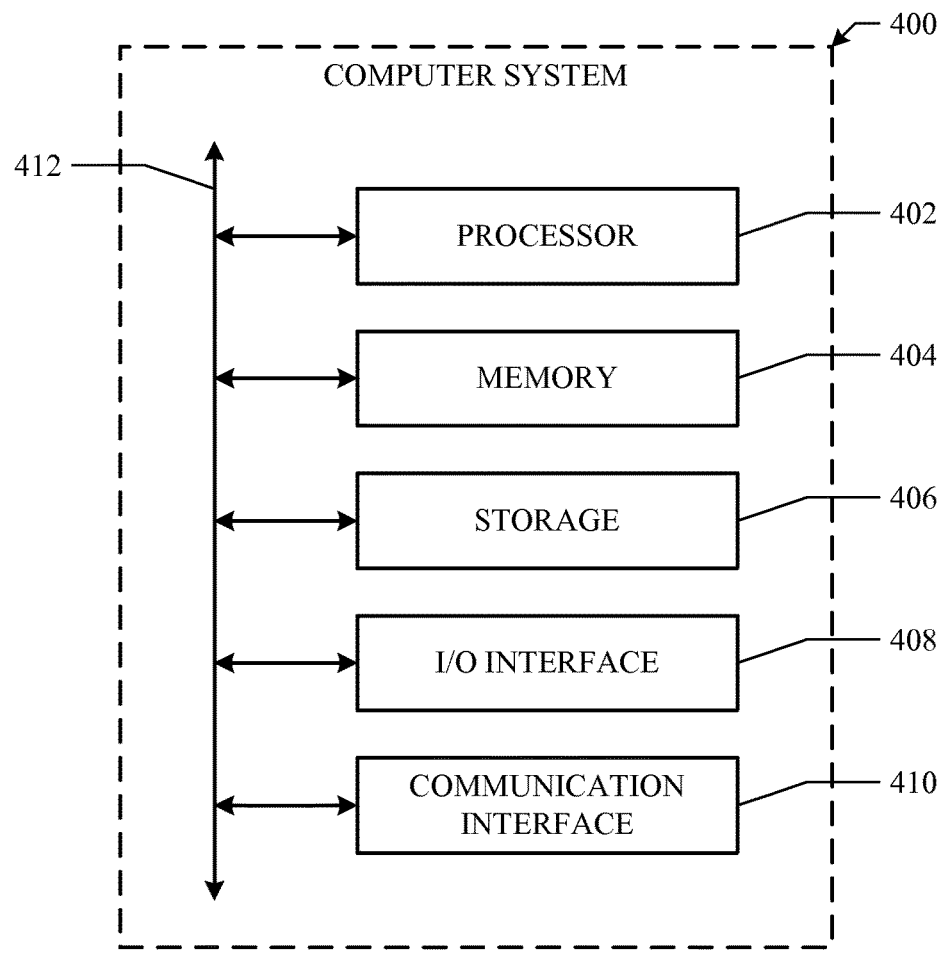
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices associated with an online social network:
   accessing, by one or more of the computing devices, a first set of objects posted to the online social network by a plurality of client systems associated with a plurality of users of the online social network, the objects being stored in one or more data stores associated with the online social network, each object being associated with one or more comments, wherein each comment is posted to the online social network with respect to the corresponding object by a client system associated with a user of the online social network;
   generating, by one or more of the computing devices, a second set of objects by adding one or more objects in the first set of objects meeting a first filtering criteria to the second set;
   scoring, by one or more of the computing devices, each object in the second set of objects by comparing the comments associated with each object to a pre-determined set of terms associated with a first object-classification;
   generating, by one or more of the computing devices, a training set of objects from the second set of objects by selecting each object from the second set of objects having a score greater than a first threshold score, each object in the training set being pre-classified with the first object-classification;
   generating, by one or more of the computing devices, an object-classifier algorithm for the first object-classification, the object-classifier algorithm comprising one or more features each comprising a text expression and stored in association with a feature score indicating a level of correlation between the corresponding feature and the first object-classification and being determined through an iterative training process performed one or more times, each iteration of the iterative training process comprising:
      training an initial object-classifier algorithm based on the comments associated with the objects in the training set of objects;
      accessing a third set of objects posted to the online social network by a plurality of client systems associated with a plurality of users of the online social network, the objects being stored in one or more data stores associated with the online social network, each object being associated with one or more comments, wherein each comment is posted to the online social network with respect to the corresponding object by a client system associated with a user of the online social network;
      classifying, using the initial object-classifier algorithm, each object in the third set of objects based on an analysis of the comments associated with each object, one or more of the objects in the third set of objects being classified with the first object-classification, wherein the analysis comprises comparing the comments with the features;
      training a revised object-classifier algorithm based on the comments associated with the objects in the third set of objects having the first object-classification, wherein the training comprises revising one or more features of the initial object-classifier algorithm;
      accessing a fourth set of objects stored in one or more data stores associated with the online social network, the fourth set of objects being generated by applying a second filtering criteria to a fifth set of objects posted to the online social network by a plurality of client systems associated with a plurality of users, the objects being stored in one or more data stores associated with the online social network, each object being associated with one or more comments, wherein each comment is posted to the online social network with respect to the corresponding object by a client system associated with a user of the online social network;
      classifying, using the revised object-classifier algorithm, each object in the fourth set of objects based on an analysis of the comments associated with each object, one or more objects in the fourth set of objects being classified with the first object-classification, wherein the analysis comprises comparing the comments with the modified features;
      determining a level of precision associated with the object-classifier algorithm; and
      if the determined level of precision does not satisfy a specified threshold level of precision:
         then, generating a sixth set of objects from the fourth set of objects by selecting each object from the fourth set of objects having a score greater than a second threshold score, each object in the sixth set of objects being classified with the first object-classification, wherein the sixth set of objects is to be used as the training set in a next iteration of the iterative training process;
         else, terminating the iterative training process and storing the revised object-classifier algorithm; and
   classifying, using the generated object-classifier algorithm, a particular object posted by a client system associated with a particular user, wherein the particular object is classified with the first object-classification; and
   determining a status of the particular user posting the particular object based at least in part on the classification of the particular object.

2. The method of claim 1, further comprising:
accessing a social graph comprising a plurality of nodes and a plurality of edges connecting the nodes, each node corresponding to an object associated with the online social network.

3. The method of claim 2, wherein, for each object in the first set of objects, the object is a post by a first user of the online social network corresponding to a first node of the plurality of nodes, and wherein each comment associated with the object is a comment on the post by a second user of the online social network, each second user corresponding to a second node, each second node being within a single degree of separation from the first node in the social graph.

4. The method of claim 1, wherein the objects of the first set of objects are each of an object-type selected from a group consisting of: photos, posts, pages, applications, events, locations, or user groups.

5. The method of claim 1, wherein:
adding one or more objects in the first set of objects meeting a first filtering criteria to the second set comprises comparing metadata associated with each object in the first set of objects to a set of filtering criteria.

6. The method of claim 5, wherein the metadata comprises one or more of: social-graph information associated with the object, other objects associated with the object, a language associated with the object, a time or date associated with the object, or any combination thereof.

7. The method of claim 6, wherein the social-graph information comprises an affinity coefficient between first and second users of the online social network, the first user being associated with an object in the first set of objects.

8. The method of claim 1, wherein scoring each object in the second set of objects comprises determining a score for each comment associated with the object by comparing the comment to the pre-determined set of terms associated with the first object-classification.

9. The method of claim 1, wherein scoring each object in the second set of objects comprises:
determining, for each object in the second set of objects, a score for each comment associated with the object; and
combining, for each object in the second set of objects, the scores for the comments to produce an object score.

10. The method of claim 9, wherein the object score is an average of the scores for the comments.

11. The method of claim 1, wherein the first threshold score is greater than 90% of the scores of the objects in the second set of objects.

12. The method of claim 1, wherein training the initial object-classifier algorithm comprises:
analyzing the comments associated with the objects in the training set to determine an initial set of features;
scoring each feature in the initial set of features based on a frequency of occurrence of the feature in the comments associated with the objects in the training set; and
modifying the initial object-classifier algorithm to associate at least in part the first object-classification with one or more of the features in the initial set of features having a score greater than a threshold feature score.

13. The method of claim 1, wherein classifying each object in the third set of objects comprises comparing the comments associated with an object in the third set to features associated with the initial object-classifier algorithm to determine whether the object is classified with the first object-classification.

14. The method of claim 1, wherein training the revised object-classifier algorithm comprises:
analyzing the comments associated with the objects in the third set of objects having the first object-classification to determine a set of revised features;
scoring each revised feature in the set of revised features based on a frequency of occurrence of the feature in the comments associated with the objects in the third set of objects having the first object-classification; and
modifying the revised object-classifier algorithm to associate at least in part the first object-classification with one or more of the features in the set of revised features having a score greater than a threshold feature score.

15. The method of claim 1, wherein classifying each object in the fourth set of objects comprises comparing the comments associated with an object in the fourth set to features associated with the revised object-classifier algorithm to determine whether the object is classified with the first object-classification.

16. The method of claim 1, wherein training the initial object-classifier algorithm is further based on the revised object-classifier algorithm trained in a prior iteration of the iterative training process.

17. The method of claim 1, wherein one or more of the first, third, or fifth sets of objects each comprise objects that are randomly selected from objects associated with the online social network.

18. The method of claim 1, wherein the first, third, and fifth sets of objects each comprise greater than or equal to one million objects.

19. One or more computer-readable non-transitory storage media embodying software that is operable when executed to:
access, by one or more of the computing devices, a first set of objects posted to the online social network by a plurality of client systems associated with a plurality of users of the online social network, the objects being stored in one or more data stores associated with an online social network, each object being associated with one or more comments, wherein each comment is posted to the online social network with respect to the corresponding object by a client system associated with a user of the online social network;
generate, by one or more of the computing devices, a second set of objects by adding one or more objects in the first set of objects meeting a first filtering criteria to the second set;
score, by one or more of the computing devices, each object in the second set of objects by comparing the comments associated with each object to a pre-determined set of terms associated with a first object-classification;
generate, by one or more of the computing devices, a training set of objects from the second set of objects by selecting each object from the second set of objects having a score greater than a first threshold score, each object in the training set being pre-classified with the first object-classification;
generate, by one or more of the computing devices, an object-classifier algorithm for the first object-classification, the object-classifier algorithm comprising one or more features each comprising a text expression and stored in association with a feature score indicating a level of correlation between the corresponding feature and the first object-classification and being determined through an iterative training process performed one or more times, each iteration of the iterative training process comprising:
train an initial object-classifier algorithm based on the comments associated with the objects in the training set of objects;
access a third set of objects posted to the online social network by a plurality of client systems associated with a plurality of users of the online social network, the objects being stored in one or more data stores associated with the online social network, each object being associated with one or more comments, wherein each comment is posted to the online social network with respect to the corresponding object by a client system associated with a user of the online social network;

classify, using the initial object-classifier algorithm, each object in the third set of objects based on an analysis of the comments associated with each object, one or more of the objects in the third set of objects being classified with the first object-classification, wherein the analysis comprises comparing the comments with the features;

train a revised object-classifier algorithm based on the comments associated with the objects in the third set of objects having the first object-classification, wherein the training comprises revising one or more features of the initial object-classifier algorithm;

access a fourth set of objects stored in one or more data stores associated with the online social network, the fourth set of objects being generated by applying a second filtering criteria to a fifth set of objects posted to the online social network by a plurality of client systems associated with a plurality of users, the objects being stored in one or more data stores associated with the online social network, each object being associated with one or more comments, wherein each comment is posted to the online social network with respect to the corresponding object by a client system associated with a user of the online social network;

classify, using the revised object-classifier algorithm, each object in the fourth set of objects based on an analysis of the comments associated with each object, one or more objects in the fourth set of objects being classified with the first object-classification, wherein the analysis comprises comparing the comments with the modified features;

determine a level of precision associated with the object-classifier algorithm; and if the determined level of precision does not satisfy a specified threshold level of precision:
then, generate a sixth set of objects from the fourth set of objects by selecting each object from the fourth set of objects having a score greater than a second threshold score, each object in the sixth set of objects being classified with the first object-classification, wherein the sixth set of objects is to be used as the training set in a next iteration of the iterative training process;
else, terminate the iterative training process and storing the revised object-classifier algorithm; and classify, using the generated object-classifier algorithm, a particular object posted by a client system associated with a particular user, wherein the particular object is classified with the first object-classification; and determine a status of the particular user posting the particular object based at least in part on the classification of the particular object.

20. A system comprising: one or more processors; and a memory coupled to the processors comprising instructions executable by the processors, the processors operable when executing the instructions to:

access, by one or more of the computing devices, a first set of objects posted to the online social network by a plurality of client systems associated with a plurality of users of the online social network, the objects being stored in one or more data stores associated with an online social network, each object being associated with one or more comments, wherein each comment is posted to the online social network with respect to the corresponding object by a client system associated with a user of the online social network;

generate, by one or more of the computing devices, a second set of objects by adding one or more objects in the first set of objects meeting a first filtering criteria to the second set;

score, by one or more of the computing devices, each object in the second set of objects by comparing the comments associated with each object to a pre-determined set of terms associated with a first object-classification;

generate, by one or more of the computing devices, a training set of objects from the second set of objects by selecting each object from the second set of objects having a score greater than a first threshold score, each object in the training set being pre-classified with the first object-classification;

generate, by one or more of the computing devices, an object-classifier algorithm for the first object-classification, the object-classifier algorithm comprising one or more features each comprising a text expression and stored in association with a feature score indicating a level of correlation between the corresponding feature and the first object-classification and being determined through an iterative training process performed one or more times, each iteration of the iterative training process comprising:
train an initial object-classifier algorithm based on the comments associated with the objects in the training set of objects;
access a third set of objects posted to the online social network by a plurality of client systems associated with a plurality of users of the online social network, the objects being stored in one or more data stores associated with the online social network, each object being associated with one or more comments, wherein each comment is posted to the online social network with respect to the corresponding object by a client system associated with a user of the online social network;
classify, using the initial object-classifier algorithm, each object in the third set of objects based on an analysis of the comments associated with each object, one or more of the objects in the third set of objects being classified with the first object-classification, wherein the analysis comprises comparing the comments with the features;
train a revised object-classifier algorithm based on the comments associated with the objects in the third set of objects having the first object-classification, wherein the training comprises revising one or more features of the initial object-classifier algorithm;
access a fourth set of objects stored in one or more data stores associated with the online social network, the fourth set of objects being generated by applying a second filtering criteria to a fifth set of objects posted to the online social network by a plurality of client systems associated with a plurality of users, the objects being stored in one or more data stores associated with the online social network, each object being associated with one or more comments, wherein each comment is posted to the online social network with respect to the corresponding object by a client system associated with a user of the online social network;

classify, using the revised object-classifier algorithm, each object in the fourth set of objects based on an analysis of the comments associated with each object, one or more objects in the fourth set of objects being classified with the first object-classification, wherein the analysis comprises comparing the comments with the modified features;

determine a level of precision associated with the object-classifier algorithm; and if the determined level of precision does not satisfy a specified threshold level of precision:

then, generate a sixth set of objects from the fourth set of objects by selecting each object from the fourth set of objects having a score greater than a second threshold score, each object in the sixth set of objects being classified with the first object-classification, wherein the sixth set of objects is to be used as the training set in a next iteration of the iterative training process;

else, terminate the iterative training process and storing the revised object-classifier algorithm; and classify, using the generated object-classifier algorithm, a particular object posted by a client system associated with a particular user, wherein the particular object is classified with the first object-classification; and determine a status of the particular user posting the particular object based at least in part on the classification of the particular object.

\* \* \* \* \*